USO09311460B2

(12) United States Patent
Ono et al.

(10) Patent No.: US 9,311,460 B2
(45) Date of Patent: Apr. 12, 2016

(54) PROGRAMMABLE CONTROLLER SYSTEM, TOOL DEVICE, TOOL PROGRAM, STORAGE MEDIUM, AND PROGRAMMABLE CONTROLLER

(75) Inventors: Akio Ono, Moriyama (JP); Yoshihiro Mihara, Kyoto (JP); Jintaro Deki, Ritto (JP); Hiroshi Iseda, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 639 days.

(21) Appl. No.: 13/399,056

(22) Filed: Feb. 17, 2012

(65) Prior Publication Data

US 2012/0239941 A1  Sep. 20, 2012

Related U.S. Application Data

(63) Continuation of application No. PCT/JP2011/071859, filed on Sep. 26, 2011.

(30) Foreign Application Priority Data

Mar. 15, 2011 (JP) ................................ 2011-056867

(51) Int. Cl.
 *G06F 21/00* (2013.01)
 *G06F 21/12* (2013.01)

(52) U.S. Cl.
 CPC ...... *G06F 21/121* (2013.01); *G06F 2221/0755* (2013.01)

(58) Field of Classification Search
 USPC ........................................................ 713/189
 See application file for complete search history.

(56) References Cited

U.S. PATENT DOCUMENTS

| | | | | |
|---|---|---|---|---|
| 5,295,263 | A * | 3/1994 | Kojima | G06F 8/67 713/100 |
| 5,298,724 | A * | 3/1994 | Wratil | G06Q 20/341 235/380 |
| 6,167,344 | A * | 12/2000 | Fackler | G11C 16/22 701/1 |
| 6,272,578 | B1 * | 8/2001 | Jinkawa | G05B 19/056 710/110 |
| 6,505,084 | B2 * | 1/2003 | Blumenstock | 700/21 |

(Continued)

FOREIGN PATENT DOCUMENTS

| | | |
|---|---|---|
| JP | 61-206035 | 9/1986 |
| JP | 7-129207 | 5/1995 |

(Continued)

OTHER PUBLICATIONS

Canet, Géraud, et al. "Towards the automatic verification of PLC programs written in Instruction List." Systems, Man, and Cybernetics, 2000 IEEE International Conference on. vol. 4. IEEE, 2000.*

*Primary Examiner* — Harris C Wang
(74) *Attorney, Agent, or Firm* — Greenblum & Bernstein, P.L.C.

(57) ABSTRACT

A programmable controller system, a tool device, a tool program, a storage medium, and a programmable controller capable of affording greater convenience in terms of preventing unauthorized use of user program running on the programmable controller. In the programmable controller system, the tool device sets up a first user program execution ID in a second non-volatile memory provided in the PLC and sets up a second user program execution ID in a project provided in the tool device. The PLC performs a matching operation to determine whether or not the first user program execution ID matches the second user program execution ID and blocks the execution of the user program if there is a mismatch.

6 Claims, 10 Drawing Sheets

(56) References Cited

U.S. PATENT DOCUMENTS

| | | | |
|---|---|---|---|
| 6,722,986 B1* | 4/2004 | Lyons | G06F 21/51 463/29 |
| 2003/0061349 A1* | 3/2003 | Lo et al. | 709/225 |
| 2003/0144753 A1* | 7/2003 | Otani | G05B 19/05 700/87 |
| 2004/0133753 A1* | 7/2004 | Fulton | G05B 19/05 711/155 |
| 2006/0253838 A1* | 11/2006 | Fujii | 717/124 |
| 2007/0079370 A1* | 4/2007 | Jinkawa | G06F 21/34 726/19 |
| 2010/0004758 A1* | 1/2010 | Masui | G05B 19/058 700/9 |
| 2012/0239941 A1* | 9/2012 | Ono | G06F 21/121 713/189 |
| 2012/0310379 A1* | 12/2012 | Chiba | G05B 19/05 700/79 |

FOREIGN PATENT DOCUMENTS

| | | |
|---|---|---|
| JP | 2002-023870 | 1/2002 |
| JP | 2009-70144 | 4/2009 |
| WO | 2011/099146 | 8/2011 |

\* cited by examiner (Exemplary processing performed by the PLC as a whole)

(First user program execution ID setup screen)

(First user program execution ID receipt and transmission process)

| First user program execution ID set up or not | Second user program execution ID set up or not | Match Status | Checking results |
|---|---|---|---|
| No | No | — | Match |
| Yes | Yes | Identical | Match |
| Yes | No | — | No match |
| No | Yes | — | No match |
| Yes | Yes | Not identical | No match |

_US 9,311,460 B2_

PROGRAMMABLE CONTROLLER SYSTEM, TOOL DEVICE, TOOL PROGRAM, STORAGE MEDIUM, AND PROGRAMMABLE CONTROLLER

CROSS-REFERENCE TO RELATED APPLICATIONS

This is a continuation application of PCT/JP2011/071859 filed Sep. 26, 2011, designating the United States of America, the disclosure of which, including the specification, drawings, and claims, is incorporated by reference in its entirety. The disclosure of Japanese Patent Application No. 2011-056867 filed Mar. 15, 2011, including the specification, drawings, and claims is expressly incorporated herein by reference in its entirety.

FIELD OF DISCLOSURE

The present disclosure relates to a programmable controller system comprising a tool device possessing the capability to communicate with a programmable controller and preventing unauthorized use of a user program running on the programmable controller, a tool program, a tool device, a storage medium, and a programmable controller.

BACKGROUND INFORMATION

In general, programmable controllers (hereinafter referred to as "PLCs") are shipped by PLC manufacturers, after which they are either incorporated into automatic packaging machines, injection molding equipment, or other industrial machinery by a vendor and installed in this state at a factory of an end user, or incorporated into equipment at an end user's factory directly by an end user.

In one of the above cases, namely when a PLC is installed at an end user's factory after having been incorporated into industrial machinery by a vendor, the vendor develops user programs (control programs) and embeds the developed user programs into the PLC in order to bring the industrial machinery whose operation is controlled by the PLC into compliance with the desired operation specifications.

At such time, in addition to providing PLCs embedded with the developed user programs, it is a common practice for vendors to provide the user programs to the end user in the form of reference user programs stored on a CD-ROM or other storage media.

The reference user programs provided by the vendors in this manner may be subject to minor program customization, provision of references to data values (I/O monitor), and the like on the end user side. With the exception of comments and labels attached in order to enhance understanding on the part of the end user, the contents of the reference user programs provided to the end user for the purpose of minor program customization and inclusion of references to data values (I/O monitor), etc. are substantially the same as the actual production-level user programs embedded into PLCs.

For this reason, there is concern that empty PLCs having no loaded user programs may be prepared and the reference user programs may be loaded thereon on the end user side, thereby permitting unauthorized copying of any number of actual production-level PLCs and causing major losses on the vendor side.

In addition, there is also concern that if such reference user programs end up in the hands of persons other than the original end user and similar unauthorized copying of actual production-level PLCs takes place, the manufacturing technology know-how that is contained in the user programs may be leaked and enormous damage may result from the technology drain.

In this connection, Patent Document 1 (Japanese Patent Application Publication No. 2009-70144) discloses a programming method, in which an arbitrary hardware ID used as a matching criterion and written into the memory of a PLC is checked against an arbitrary hardware ID that is to be checked and is specified by an operand in a user program.

PATENT DOCUMENTS

Patent Document 1: JP 2009-70144A

PROBLEM TO BE SOLVED BY THE DISCLOSURE

However, for a user to perform hardware ID matching, the programming method used in the PLC described in Patent Document 1 (Japanese Patent Application Publication No. 2009-70144) requires that user programs be created, which is not convenient in terms of preventing unauthorized use of the user programs running on the programmable controller.

Accordingly, it is an object of the present disclosure to provide a programmable controller system, a tool device, a tool program, a storage medium, and a programmable controller capable of affording greater convenience in terms of preventing unauthorized use of the user program running on the programmable controller.

SUMMARY OF THE DISCLOSURE

In order to eliminate the above-mentioned problems, the present disclosure provides the following programmable controller system, tool device, tool program, storage medium (non-transitory storage medium), and programmable controller.

According to an aspect of the present disclosure, a programmable controller system includes a programmable controller and a tool device that communicates with the programmable controller and is adapted to cause execution of a user program on the programmable controller. The tool device includes a first receiving section (a first receiver) that receives entry information for a first user program execution ID that is checked in order to execute the user program. A a transmitting section (a transmitter) that transmits the first user program execution ID to the programmable controller. A second receiving section (a second receiver receives entry information for a second user program execution ID that is checked in order to run the user program. A first setup section (a first program setter) sets up the second user program execution ID in the device in association with the user program. The tool device is configured to permit neither setup nor erasure of the second user program execution ID once the second user program execution ID has been set up and is configured to possess neither the capability to display the first user program execution ID nor the capability to display the second user program execution ID. According to another aspect of the present disclosure, the programmable controller includes a second setup section (a second program setter) that sets up the first user program execution ID transmitted by the transmitting section (transmitter) to the programmable controller in the programmable controller. A checking section (a comparator checker) checks whether or not the first user program execution ID matches the second user program execution ID. An execution-blocking section (a block executor) blocks the execution of the user program when, according to the checking results obtained by checking with the checking section (comparator checker), the first user program execution ID does not match the second user program execution ID. Additionally, the programmable controller is configured to permit setting up and erasing the first user program execution ID.

According to an aspect of the present disclosure, a tool device is provided in a programmable controller system. The tool device includes a first receiving section (a first receiver) that receives entry information for a first user program execution ID that is checked in order to execute the user program, a transmitting section (transmitter) that transmits the first user program execution ID to the programmable controller, a second receiving section (a second receiver) that receives entry information for a second user program execution ID that is checked in order to run the user program, and a first setup section (a program setter) that sets up the second user program execution ID in the device in association with the user program. The tool device is configured to permit neither setup nor erasure of the second user program execution ID once the second user program execution ID has been set up, and is configured to possess neither the capability to display the first user program execution ID nor the capability to display the second user program execution ID.

According to another aspect of the present disclosure, a non-transitory storage medium includes a tool program for causing a control section (controller) provided in the tool device to function a first receiving section (a first receiver), a transmitting section (a transmitter), a second receiving section (a second receiver), and a first setup section (a first program setter).

According to another aspect of the present disclosure, a non-transitory computer-readable storage medium includes a tool program recorded thereon.

According to another aspect of the present disclosure, a programmable controller provided in the programmable controller system includes a second setup section (a program setter) that sets up the first user program execution ID transmitted by the transmitting section (a transmitter) to the programmable controller in the programmable controller, a checking section (a comparator checker) checking whether or not the first user program execution ID matches the second user program execution ID, and an execution-blocking section (a block executor) that blocks the execution of the user program when, according to the checking results obtained by checking with the checking section (comparator checker), the first user program execution ID does not match the second user program execution ID, and is configured to permit setting up and erasing the first user program execution ID.

In addition, as should be appreciated, the term "ID" used in the present disclosure is an abbreviation of "identification" and refers to an identification code.

According to one aspect of the present disclosure, the entry information for the first user program execution ID is received by the first receiving section (first receiver), the first user program execution ID is transmitted to the programmable controller by the transmitting section (transmitter), and the first user program execution ID transmitted by the transmitting section to the programmable controller is set up in the programmable controller by the second setup section (second program setter). In addition to that, the entry information for the second user program execution ID that is checked in order to run the user program is received by the second receiving section (second receiver) and the second user program execution ID is set up in the apparatus in association with the user program by the first setup section (first program setter). For this reason, even if the user does not develop a user program in order to perform ID matching, the unauthorized use of the user program running on the programmable controller can prevented based on a simple operation involving entering an ID, thereby making it possible to improve convenience in terms of precluding the unauthorized use of the user program running on the programmable controller.

Another aspect of the present disclosure can be illustrated by an embodiment, in which the tool device is configured to manage information on multiple user programs as a single project and the first setup section (first program setter) sets up the second user program execution ID for the project.

In this characteristic feature, the user programs are managed as the above-mentioned project and the second user program execution ID is set up in the project by the first setup section (first program setter). As a result, the second user program execution ID can be easily associated with the user programs.

Another aspect of the present disclosure can be illustrated by an embodiment, in which the tool device comprises an encrypting section (encryptor) that encrypts the first user program execution ID received by the first receiving section (first receiver) and the second user program execution ID received by the second receiving section (second receiver). The transmitting section (transmitter) transmits the first user program execution ID encrypted by the encrypting section (encryptor) to the programmable controller, the first setup section (first program setter) sets up the second user program execution ID encrypted by the encrypting section (encryptor) in the tool device, and the second setup section (second program setter) sets up the first user program execution ID encrypted by the encrypting section (encryptor) and transmitted to the programmable controller by the transmitting section (transmitter) in the programmable controller.

In this characteristic feature, the encryption section (encryptor) encrypts the first user program execution ID received by the first receiving section (first receiver) and the second user program execution ID received the second receiving section (second receiver) and, for this reason, even if the first user program execution ID and/or information on the second user program execution ID are unlawfully read and stolen, persons other than the original user will not know the first user program execution ID and/or second user program execution ID because the first user program execution ID and second user program execution ID are encrypted. This makes it possible to improve security in terms of preventing the first user program execution ID and/or second user program execution ID from being leaked.

Another aspect of the present disclosure can be illustrated by an embodiment, in which the transmitting section (transmitter) transmits the second user program execution ID to the programmable controller and the programmable controller comprises a storage control section (storage controller) that stores the second user program execution ID transmitted to the programmable controller by the transmitting section (transmitter) in the programmable controller.

In this characteristic feature, the second user program execution ID is stored in the programmable controller by the storage control section, which makes it possible to easily match the first user program execution ID and second user program execution ID even without acquiring the second user program execution ID from the tool device during each matching operation performed by the checking section (comparator checker).

Another aspect of the present disclosure can be illustrated by an embodiment, in which the tool device comprises an appending section (appender) that appends the second user program execution ID to the user program, the transmitting section (transmitter) transmits the user program to which the second user program execution ID has been appended by the appending section (appender) to the programmable controller, and the storage control section (storage controller) stores the user program that has the second user program execution ID appended thereto by the appending section (appender) and transmitted to the programmable controller by the transmitting section (transmitter) in the programmable controller.

In this characteristic feature, the second user program execution ID is appended to the user program by the appending section (appender) and the user program to which the second user program execution ID has been appended by the appending section (appender) are transmitted to the programmable controller and stored in the programmable controller by the storage control section (storage controller), thereby making it possible to conceal the existence of the second user program execution ID in the programmable controller.

Another aspect of the present disclosure can be illustrated by an embodiment, in which the programmable controller is configured to store the user program in a non-volatile memory provided in the programmable controller and the checking section (comparator checker) matches the first user program execution ID against the second user program execution ID when the user program stored in the non-volatile memory are stored in a volatile memory that is provided in the programmable controller and stores the user program.

In this characteristic feature, due to the fact that the checking section (comparator checker) matches the first user program execution ID against the second user program execution ID when storing the user program stored in the non-volatile memory in the volatile memory, the first user program execution ID and the second user program execution ID can be reliably checked prior to running the user program.

Another aspect of the present disclosure can be illustrated by an embodiment, in which the programmable controller comprises an unblocking section (unblocker) that unblocks the execution of the user program blocked by the execution-blocking section (block executor) by restarting the programmable controller.

In this characteristic feature, when the execution of the user program is blocked by the execution-blocking section (block executor), the execution of the user program blocked by the execution-blocking section (block executor) can be unblocked by the unblocking section (unblocker) by restarting the programmable controller. This can increase the level of effort involved in unauthorized setup of the first user program execution ID in the programmable controller by persons other than the original user, and therefore, allows for wrongdoing by other persons to be precluded.

EFFECTS OF THE DISCLOSURE

As explained above, according to the present disclosure, in the tool device, the entry information for the second user program execution ID checked in order to run the user program is received by the second receiving section (second receiver) and the second user program execution ID is set up in the apparatus by the first setup section (first program setter) in association with the user program. For this reason, unauthorized use of the user program running on the programmable controller can be prevented even if the user does not develop a user program in order to perform ID matching and, as a result, the level of convenience in precluding the unauthorized use of the user program running on the programmable controller can be improved.

DETAILED DESCRIPTION

The embodiments of the present disclosure are described below with reference to the accompanying drawings. It should be noted that the embodiments below are examples that embody the present disclosure and do not limit the technical scope of the present disclosure.

Figure 1:
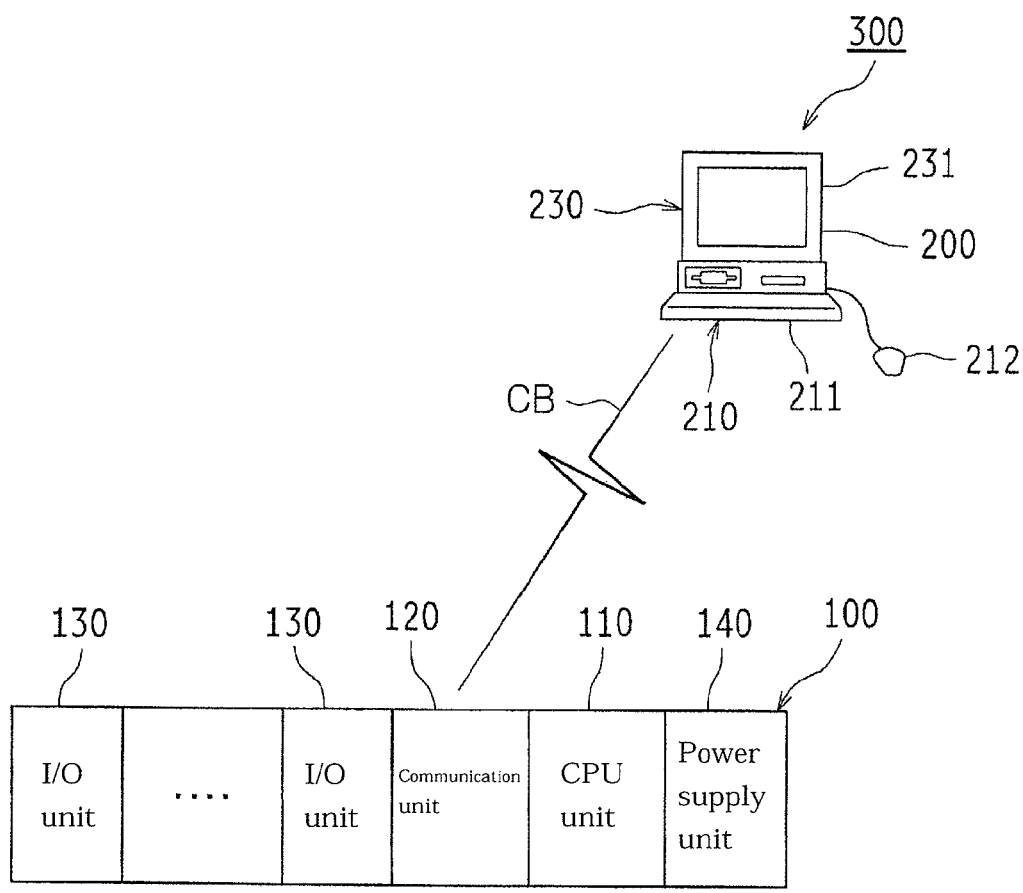
FIG. 1 is a schematic block diagram conceptually illustrating the tool device and the programmable controller communicating therewith in the programmable controller system.

[Overall Configuration of Programmable Controller System] FIG. 1 is a schematic block diagram conceptually illustrating the tool device 200 and the programmable controller 100 communicating therewith in the programmable controller system 300.

As shown in FIG. 1, the programmable controller system 300 comprises a programmable controller (referred to as the "PLC" below) 100 and a tool device 200 (here, a computer).

In the programmable controller system 300, the PLC 100 acquires a signal inputted via an I/O unit 130 into an I/O memory 117 of a CPU unit 110 (see FIG. 2, which is described below) (IN refresh), performs logical operations (executes computational operations) based on a user program YP (see FIG. 2) developed in a program description language used for controlling PLCs, such as a pre-registered ladder language, writes the computational operation execution results to the I/O memory 117, sends them to the I/O unit 130 (OUT refresh), and then cyclically repeats the so-called peripheral service processing. In this embodiment, the tool device 200, which is a user program development support apparatus (for example, the CX-Progammer, a product developed by the Applicants), is connected to the PLC 100 through a communication cable CB, downloads the user program YP and stores it in the backup memory 114 (see FIG. 2) and user memory 116 (see FIG. 2) of the CPU unit 110 provided in the PLC 100. In addition, when modifying the user program YP stored in the PLC 100, the tool device 200 uploads the user program YP stored in the PLC 100 and performs the necessary modifications, after which it re-downloads the modified user program YP to the PLC 100. It should be noted that in FIG. 1 the reference numerals 210, 211, 212, 230, and 231 respectively designate an input section, a keyboard, a pointing device, a display output section, and a display device.

[PLC Hardware Configuration] For the PLC 100, all-in-one type controllers are known that contain a CPU (Central Processing Unit) portion (the portion that controls I/O update processing, user program execution processing, peripheral service processing, etc.), an I/O circuit portion, a communication circuit portion, and various circuit portions with high-level functions, etc. in one housing, as well as controllers of the building-block type, in which these portions are contained in respective dedicated unit housings. Although the present disclosure is applicable to any type of PLCs, in this embodiment a controller of the building-block type is described as an example. In addition, besides single-task processing, during which only one task can be performed at a time, the present disclosure can be applied to multitasking, during which multiple tasks are executed in parallel.

In this embodiment, the PLC 100 is configured to comprise a CPU unit 110, a communication unit 120, multiple I/O units 130 and a power supply unit 140.

As explained below with reference to the flowchart shown in FIG. 3, the CPU unit 110, which exercises general control over the entire PLC 100, is configured to perform I/O update processing, user program execution processing, peripheral service processing, etc.

Although this is not shown in the figures, in addition to controlling communication with the tool device 200 via a LAN (Local Area Network) or another network, the communication unit 120 is used for communication control when other PLCs or remote I/O terminals etc are connected to the PLC 100.

The input/output units (I/O unit) 130 comprise exterior I/O circuitry and a terminal block, not shown, with photoelectric switches, limit switches, micro-switches, and various other external input devices, as well as relays, lamps, solenoids, and various other external output devices, not shown, wired to this terminal block.

Figure 2:
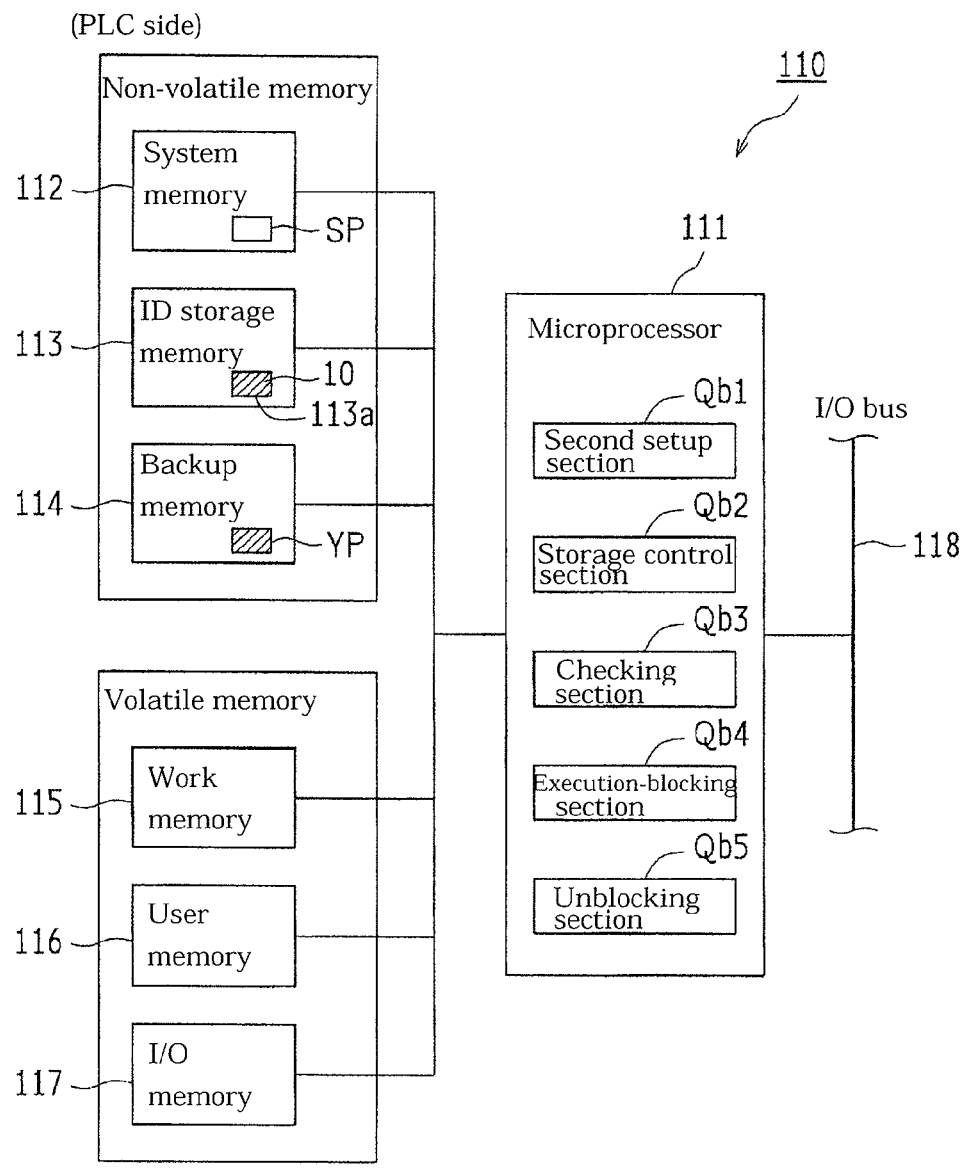
FIG. 2 is a block diagram illustrating the hardware configuration of the CPU unit in the PLC.

FIG. 2 is a block diagram illustrating the hardware configuration of the CPU unit 110 in the PLC 100.

As shown in FIG. 2, the CPU unit 110 comprises a microprocessor (MPU) 111, a system memory (SROM) 112, an ID storage memory (IDROM) 113, a backup memory (BROM) 114, a work memory (WRAM) 115, a user memory (URAM) 116, and an I/O memory (IORAM) 117.

The microprocessor 111 exercises general control over the entire CPU unit 110, and is configured to implement various functions required by the CPU unit 110 by running a system program SP stored in the system memory 112.

The system memory 112 is configured as a non-volatile memory such as a flash memory and the like and, as noted above, stores various system programs SP run by the microprocessor 111.

In this example, the ID storage memory 113 is configured as a re-writable non-volatile memory, such as an electrically re-writable EPROM (Electrically Erasable Programmable Read Only Memory), etc. The ID storage memory 113 is non-removably mounted (directly attached) to a control board, not shown, and has a first user program execution ID 10 written thereto, as described below. As described below, the first user program execution ID 10 is set up so as to permit rewriting and erasure in the ID storage memory 113 via input operations performed on the tool device 200 illustrated in FIG. 1.

The backup memory 114 is configured as a non-volatile memory such as a flash memory and the like and is adapted to maintain its contents intact when power is off even in the absence of a battery. The user program YP, which is in compliance with the control specification of the PLC 100, is written in a predetermined programming language (for example, a ladder language and the like), converted to executable object code in the microprocessor 111, and stored in the backup memory 114.

The work memory 115 operates as a work area used when the microprocessor 111 runs the system programs SP retrieved from the system memory 112 and is configured as a rewritable RAM.

The user memory 116 is a memory used for running the user program YP. The user memory 116 is configured as a static RAM (Static Random Access Memory) operating as a volatile memory and cannot maintain its contents when power is off. The user program YP transferred from the backup memory 114 is stored in the user memory 116 when power is on.

The I/O memory 117, which is consulted when the microprocessor 111 runs the user program YP read out from the user memory 116, is provided with a special auxiliary relay area, as well as an I/O data area that handles the data of the I/O terminals of the I/O units 130 (see FIG. 1) connected via an I/O bus 118, an auxiliary relay area that is used for internal computations only, and a data area that stores various setup data used in the course of computing operations, count data, and the like. In addition, in FIG. 2, the reference numeral 113a designates a storage area. In addition, the second setup section (second program setter) Qb1, storage control section (storage controller) Qb2, checking section (comparator checker) Qb3, execution-blocking section (block executor) Qb4, and unblocking section (unblocker) Qb5 illustrated in FIG. 2 will be described later.

[Processing Example for PLC as a Whole] The processing of the PLC 100 as a whole, which is executed by the microprocessor 111, will be described below with reference to FIG. 3.

Figure 3:
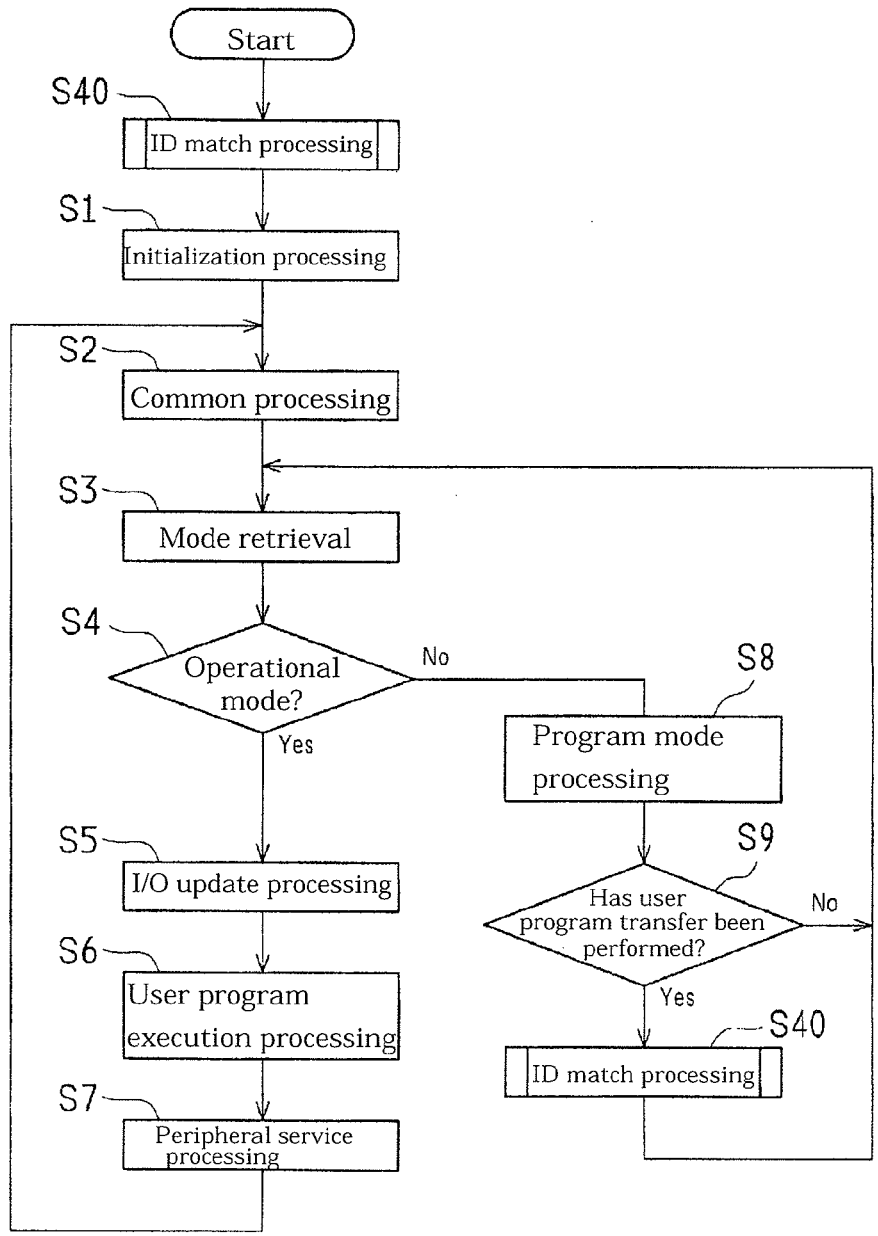
FIG. 3 is a flowchart illustrating an example of PLC-wide processing executed by the microprocessor.

FIG. 3 is a flowchart illustrating an example of processing of the PLC as a whole executed by the microprocessor.

As shown in FIG. 3, when processing is initiated by powering ON (Power On) the microprocessor 111, first of all, the microprocessor carries out ID match processing (Process S40), which is discussed below, and then carries out initialization processing (Process S1) in order to perform the initial setup of various flags and registers. The ID match Process S40 will be described in detail later on with reference to FIG. 12.

Subsequently, the microprocessor 111 carries out common processing (Process S2) as a process common to the subsequent various operating modes. During the common processing (Process S2), it carries out various types of fault diagnosis processing, such as a continuity check of the I/O bus 118, connectivity checks for each unit, and the like.

Subsequently, the microprocessor 111 loads the current operating mode settings by referring to the specified flags of the I/O memory 117 and the external mode setting switches (Process S3).

Subsequently, the microprocessor 111 determines the operating mode by matching the loaded mode setting data against the data corresponding to each mode (Process S4). Here, I/O update processing is carried out (Process S5) if it is determined that the operating mode is an "operational" mode (Process S4: Yes).

During the I/O update process (Process S5), the microprocessor 111 carries out input update processing, which updates the input data of the previously described I/O memory 117 using actual data from the input terminals of the I/O units 130, and output update processing, which updates the data of the output terminals of the I/O units 130 using the output data of the I/O memory 117.

Subsequently, the microprocessor 111 carries out user program execution processing (Process S6). The user program execution processing (Process S6) involves execution of on-command processing, during which the instructions that form part of the user program YP are consecutively read out from the user memory 116, the retrieved instructions are executed by referring to the I/O data of the I/O memory 117, and the I/O data is rewritten based on the execution results.

Subsequently, the microprocessor 111 carries out peripheral service processing (Process S7). During the peripheral service processing (Process S7), various processing operations that correspond to requests arriving from the tool device 200 are executed based on appropriate interaction with the tool device 200. Namely, if the tool device 200 requests that software be uploaded, a specified range of the user programs YP is retrieved and transmitted to the tool device 200. In addition, if a request issued by the tool device 200 requires that software be downloaded, the user program YP sent from the tool device 200 is received and written to the backup memory 114 and user memory 116. In addition, during the peripheral service processing (Process S7), when one, two, or more remote I/O terminals are connected to the PLC 100 or, alternatively, when the PLC 100 is connected to one, two, or more other PLCs, data interchange with these remote devices is carried out. After the peripheral service processing (Process S7), it advances to common processing (Process S2).

When the microprocessor 111 determines that the operating mode is a "program mode" (Process S4: No), it advances to process S8, carries out processing involving transferring the system settings etc. of the PLC 100 that correspond to the program mode, performing a download of the user program YP to the PLC 100 or its upload from the PLC 100, and creating an I/O table, and then determines whether a transfer of the user program YP has taken place (Process S9). If in Process S9 it is determined that no transfer of the user program YP has taken place (Process S9: No), it advances to S3, and, on the other hand, if in Process S9 it is determined that a transfer of the user program YP has taken place (Process S9: Yes), it carries out ID match processing (Process S40) (see FIG. 12). Subsequently, various functions of the PLC 100 are implemented by repeatedly carrying out the above-described series of processing operations (Processes S3-S9, S40).

[Hardware Configuration of the Tool Device] As previously mentioned, in this embodiment, the tool device 200 is a user program development support apparatus provided for the purpose of developing user programs YP, compiling, downloading to the PLC 100 or uploading from the PLC 100, and, in addition, configuring and changing various parameters.

When using the tool device 200 to create a user program YP, it is adapted to manage information regarding all the user programs, namely multiple user programs YP, as a single project PR (see FIG. 4 and FIG. 8, which are discussed below). Generally speaking, a tool device 200 of this type is produced by storing (installing) predetermined software programs on a computer equipped with communications capability, such as a personal computer and the like.

The tool device 200 possesses the capability to communicate with the PLC 100 and precludes unauthorized use of the user program YP running on the PLC 100.

Figure 4:
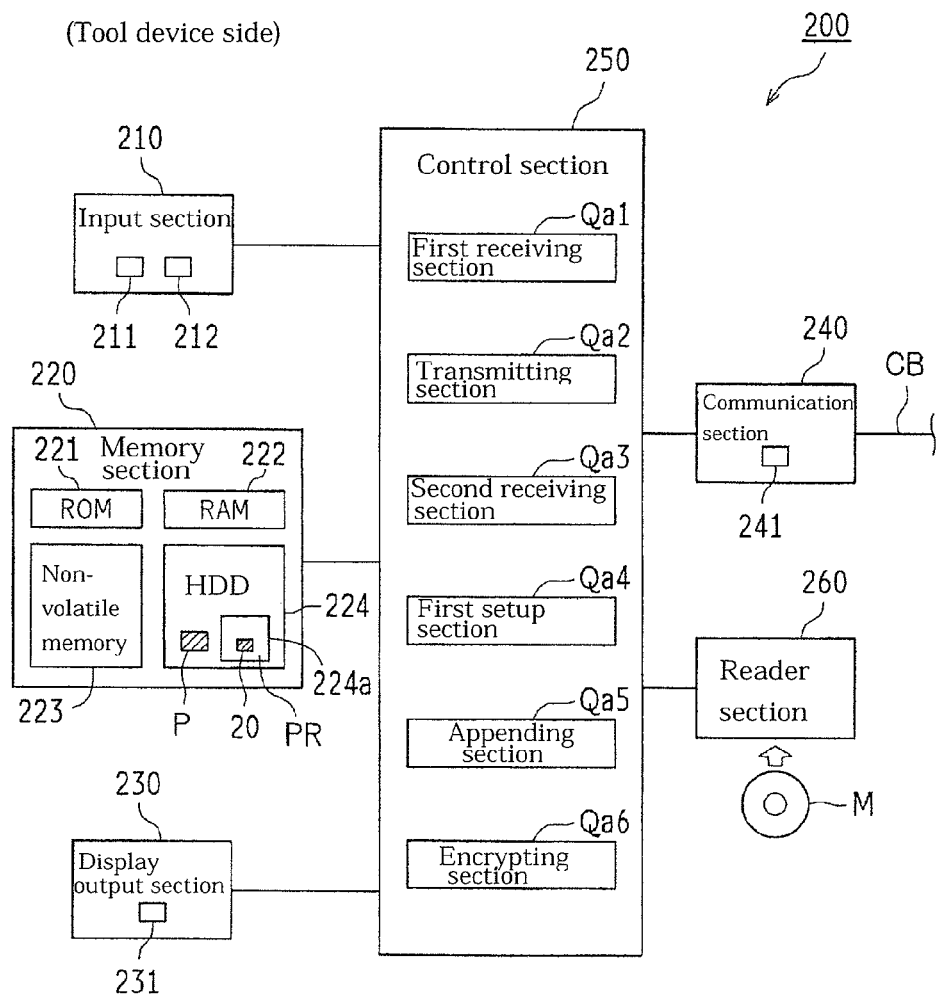
FIG. 4 is a system block diagram schematically illustrating the configuration of the tool device placed in communication with the PLC.

FIG. 4 is a system block diagram that schematically illustrates the configuration of the tool device 200 placed in communication with the PLC.

As shown in FIG. 4, the tool device 200 comprises an input section 210 (also see FIG. 1), a memory section 220, a display output section 230 (also see FIG. 1), a communication section 240, a control section 250, and a reader section 260.

The input section 210 comprises input devices, such as a keyboard 211 or a pointing device 212, etc. and is connected to the input system of the control section 250. The input section 210 is configured to receive user input operations and transmit information regarding the operations to the control section 250.

The memory section 220 comprises storage devices, such as a ROM 221, a RAM 222, a flash memory, and other non-volatile memory 223 that permits data to be rewritten, as well as bulk storage devices, such as an HDD device 224, which operates as a non-volatile memory. It should be noted that software including a tool program P, which is read by the reader section 260 that reads a storage medium M such as a CD (Compact Disk)-ROM having the hereinafter described tool program P (a program containing software for prevention of unauthorized use) recorded thereon, is stored (installed) on the HDD device 224. In addition, the storage medium M may be a USB (Universal Serial Bus) memory or an SD (Secure Digital) memory card.

The input section 230 comprises display devices 231, such as a liquid crystal display panel or an EL (electroluminiscence) display panel, and is connected to the output system of the control section 250. The display device 231 is configured to display output display information from the control section 250 on a display screen. It should be noted that a touch input device such as a touch panel and the like may be provided on the display screen of the display device 231. The touch input device is configured to allow for input operations to be performed in accordance with the display status of the screen displayed on the display screen and operates as an input section.

The communication section 240, which has an interface section 241 (more specifically, a LAN port), is designed to permit data communication between the control section 250 and a communication unit 120 (see FIG. 1) provided in the PLC 100 through the communication cable CB (more specifically, a LAN cable). It should be noted that the PLC 100 and tool device 200 are designed to be interconnected via a USB port or RS232C or another serial interface.

The control section 250, which is a CPU or another computational processing device, is designed to carry out various types of processing by loading software programs, such as the tool program P pre-stored in the HDD device 224 of the memory section 220, into the RAM 222 of the memory section 220 and executing them. The RAM 222 of the memory section 220 provides an operating work area for the control section 250. In addition, in FIG. 4, the reference numerals 20 and 224a respectively designate a second user program execution ID and a storage area.

[Software Configuration of the Tool Device] In addition, the control section 250 of the tool device 200 operates as a first receiving section (first receiver) Qa1, a transmitting section (transmitter) Qa2, a second receiving section (second receiver) Qa3, and a first setup section (first program setter) Qa4. Specifically, the tool program P, which is incorporated into the user program development support software, directs the control section 250 to perform a first receiving step, which corresponds to the first receiving section Qa1, a transmitting step, which corresponds to the transmitting section Qa2, a second receiving step, which corresponds to the second receiving section Qa3, and a first setup step, which corresponds to the first setup section Qa4. It should be noted that the appending section (appender) Qa5 and encryption section (encryptor) Qa6 illustrated in FIG. 4 will be described later.

(First Receiving Step)

The first receiving step involves receiving entry information for the first user program execution ID 10 checked in order to run the user program YP. It should be noted that in this embodiment, in the first receiving step, input operations are limited in accordance with the security level (user authenticated security level) of the users (normally vendors).

Figure 5:
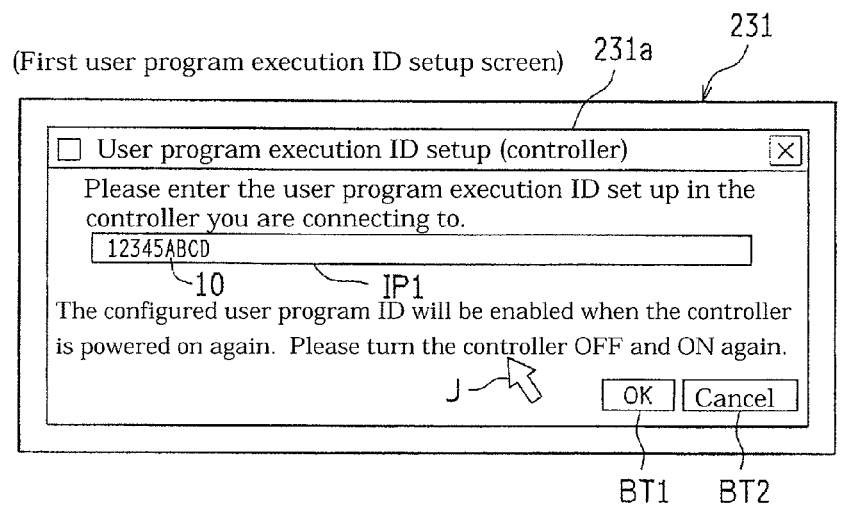
FIG. 5 is a plan view illustrating a first user program execution ID setup screen displayed on a display device provided in the tool device shown in FIG. 1.

FIG. 5 is a plan view illustrating a first user program execution ID setup screen 231*a* displayed on a display device 231 provided in the tool device 200 illustrated in FIG. 1.

As shown in FIG. 5, on the first user program execution ID setup screen 231*a* of the display device 231, an entry field IP1 used for the entry of the first user program execution ID 10 by a user with operational authority, an OK button BT1 used to approve the entry of the first user program execution ID 10, and a Cancel button BT2 used to exit the first user program execution ID setup screen 231*a* are displayed on the first user program execution ID setup screen 231*a*. Specifically, 8 to 32 half-width alphanumeric characters are entered in the entry field IP1. The first user program execution ID 10 is entered in the entry field IP1 on the first user program execution ID setup screen 231*a* through the medium of user input operations performed on the keyboard 211 (see FIG. 1). The first user program execution ID 10 entered in the entry field IP1 is transmitted to the control section 250 when, for example, the user operates a pointing device 212 (see FIG. 1) to move the cursor J and actuates (clicks on) the OK button BT3. On the other hand, actuating (clicking on) the Cancel button BT2 exits the first user program execution ID setup screen 231*a*. It should be noted that the button operations performed on the first user program execution ID setup screen 231*a* may be touch panel operations.

(Transmitting Step)

In the transmitting step, the first user program execution ID 10 received in the first receiving step is transmitted from the communication section 240 (see FIG. 4) to the PLC 100 through the communication cable CB.

(Example of Receipt and Transmission Processing of First User Program Execution ID)

Figure 6:
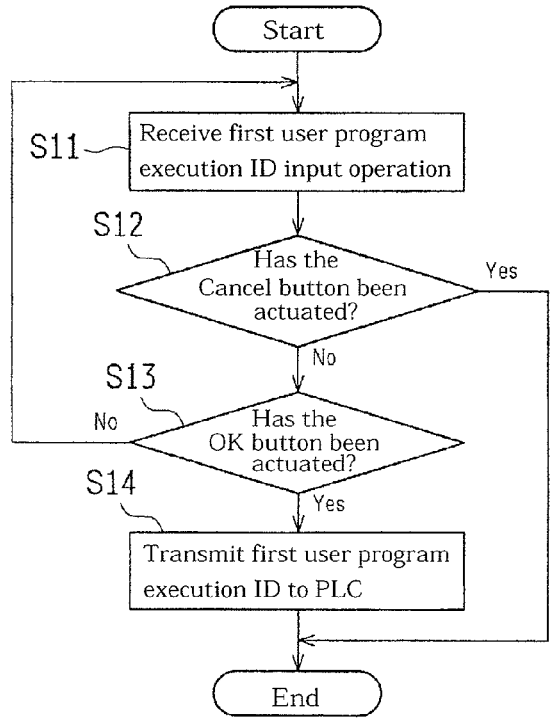
FIG. 6 is a flowchart illustrating an example of the receipt and transmission processing of the first user program execution ID.

Next, an example of the receipt and transmission processing of the first user program execution ID 10 will be described with reference to FIG. 6. FIG. 6 is a flowchart illustrating an example of the receipt and transmission processing of the first user program execution ID 10. It should be noted that the receipt and transmission processing of the first user program execution ID 10 is carried out in the program mode.

In the flowchart of the example of receipt and transmission processing illustrated in FIG. 6, first of all, the control section 250 receives the entry of the first user program execution ID 10 (see FIG. 5) (Process S11) and determines whether or not the Cancel button BT2 has been actuated (Process S12). If the Cancel button BT2 has been actuated (Processes S12: Yes), processing is terminated. On the other hand, if the Cancel button BT2 has not been actuated (Process S12: No), it is determined whether or not the OK button BT1 has been actuated (Process S13). If the OK button BT1 has not been actuated (Process S13: No), the program advances to S11 and, on the other hand, if the OK button BT1 has been actuated (Process S13: Yes), the first user program execution ID 10 is transmitted to the PLC 100 (Process S14) and processing is terminated.

(Second Receiving Step)

The second receiving step involves receiving entry information for the second user program execution ID 20 checked in order to run the user program YP.

Figure 7:
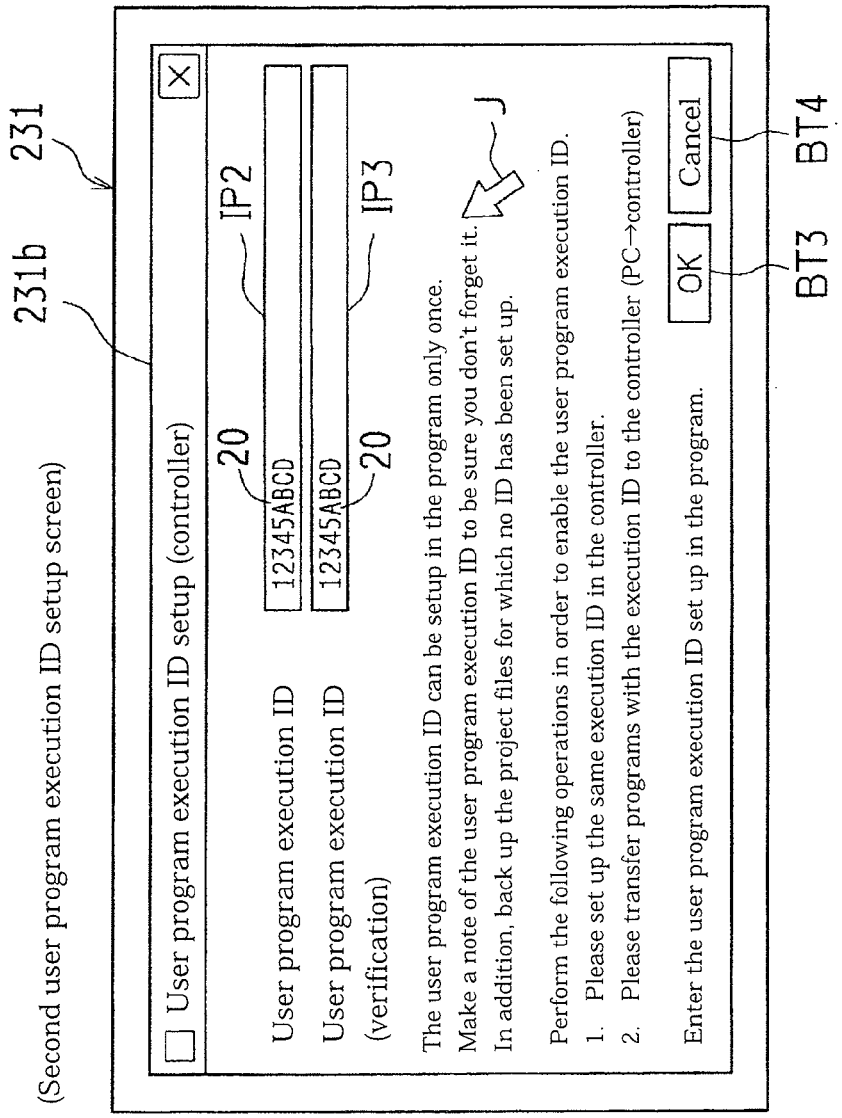
FIG. 7 is a plan view illustrating a second user program execution ID setup screen displayed on a display device provided in the tool device shown in FIG. 1.

FIG. 7 is a plan view illustrating a second user program execution ID setup screen 23 lb displayed on the display device 231 provided in the tool device 200 illustrated in FIG. 1.

As shown in FIG. 7, on the second user program execution ID setup screen 231*b* of the display device 231, a first entry field IP 2 used for the entry of the second user program execution ID 20 by a user (normally a vendor), a second entry field IP3 used for the entry of the second user program execution ID 20 for verification purposes, an OK button BT3 used to approve the entry of the second user program execution ID 20, and a Cancel button BT4 used to exit the second user program execution ID setup screen 231*b* are displayed on the second user program execution ID setup screen 231*b*. Specifically, 8 to 32 half-width alphanumeric characters are entered in the first entry field IP2 and second entry field IP3.

On the second user program execution ID setup screen 231*b*, the second user program execution ID 20 is entered in the first entry field IP2 and, in addition, the second user program execution ID 20 used for verification is entered in the second entry field IP3 through the medium of user input operations performed on the keyboard 211 (see FIG. 1). The second user program execution ID 20 that is entered in the first entry field IP2 and the second user program execution ID 20 used for verification that is entered in the second entry field IP3 are transmitted to the control section 250 when, for example, the user operates a pointing device 212 (see FIG. 1) to move the cursor J and actuates (clicks on) the OK button BT3. On the other hand, actuating (clicking on) the Cancel button BT4 exits the second user program execution ID setup screen 231*b*. It should be noted that the button operations performed on the second user program execution ID setup screen 231*b* may be touch panel operations.

(First Setup Step)

In the first setup step, a second user program execution ID 20 is configured and stored in the storage area 224*a* of the HDD apparatus 224 (see FIG. 4) provided in the tool device 200. Specifically, the first setup step is used to set up a second user program execution ID 20 for the Project PR. In the file data (called "files" for short below) of the Project PR, all the user programs, namely the multiple user programs YP, are saved along with information on the variables (data), etc. The Project PR files, in which all the user programs are saved, are stored in the HDD apparatus 224.

Figure 8:
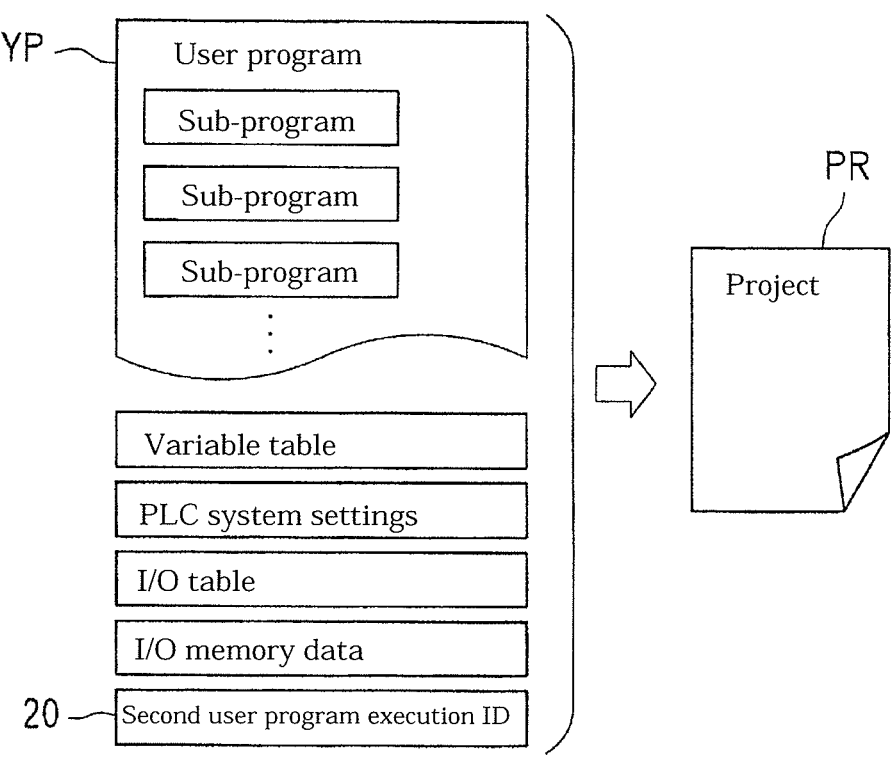
FIG. 8 is a schematic view illustrating the data structure of the project files.

FIG. 8 is a schematic view illustrating the data structure of the files of Project PR. The files of Project PR illustrated in FIG. 8 contain all the user programs, namely the multiple user programs YP, and variable tables, PLC system settings, I/O tables, I/O memory data, and other configuration data. Each individual user program YP is created in an identical Project PR file. In addition, the user programs YP are composed of multiple sub-programs. In addition, the second user program execution ID 20 is configured in the Project PR files. As a result, individual user programs YP and the second user program execution ID 20 can be easily linked (associated).

(Writing the Second User Program Execution ID)

Here, the configuration of the tool device 200 is such that it does not permit changes to settings or erasure of the second user program execution ID 20 once the second user program execution ID 20 has been set up for the Project PR.

Thus, the second user program execution ID 20 is set up only if the second user program execution ID 20 has not been set up for the Project PR in the first setup step, and after setting it up, the second user program execution ID 20 is rendered impossible to change or erase by setting ID setting flags, etc.

(Example of Processing Involved in Setting Up Second User Program Execution ID)

Figure 9:
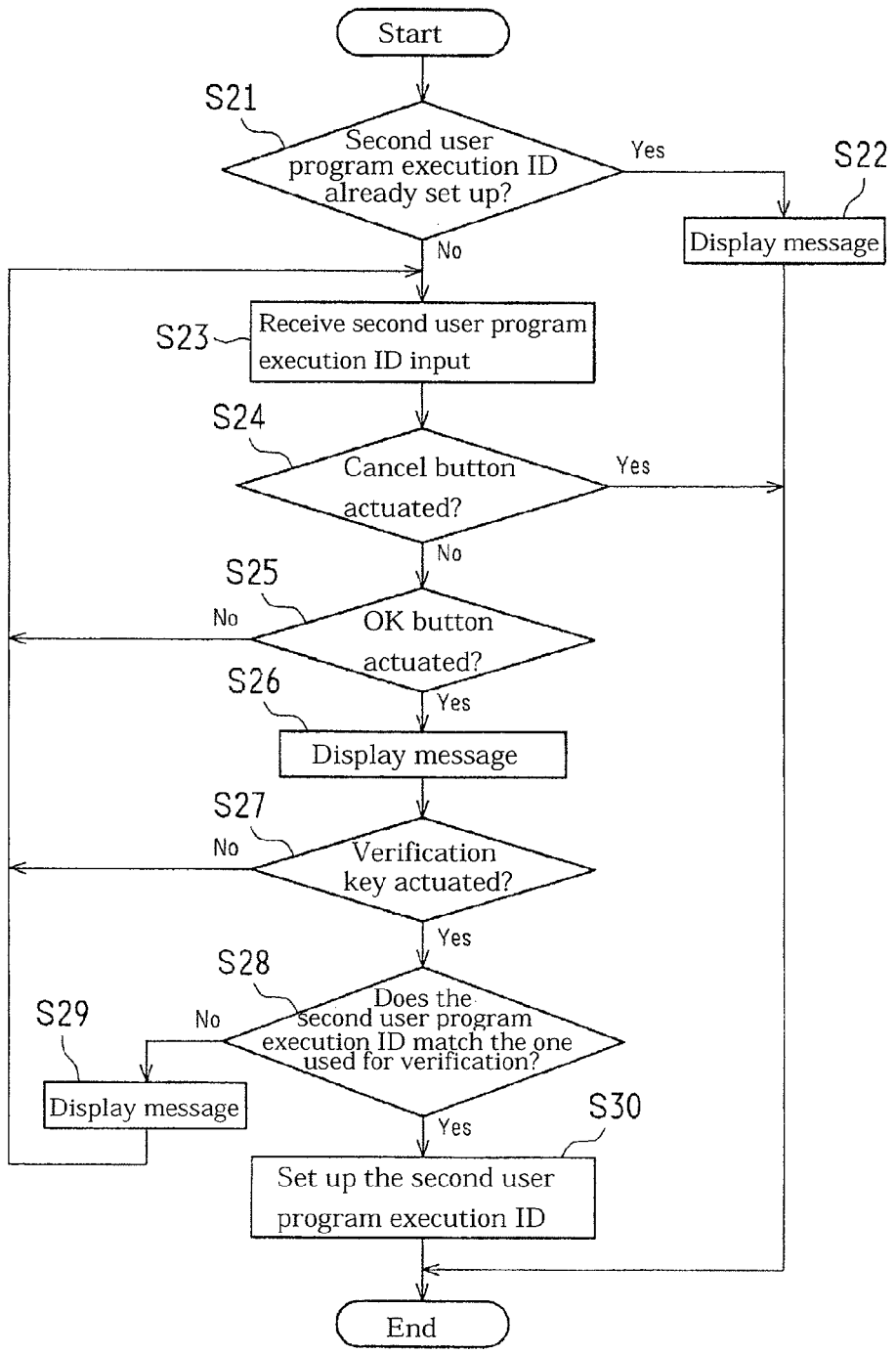
FIG. 9 is a flowchart illustrating an example of the processing involved in setting up the second user program execution ID.

An example of processing involved in setting up the second user program execution ID 20 will be explained next with reference to FIG. 9. FIG. 9 is a flowchart illustrating an example of processing involved in setting up the second user program execution ID.

In the flowchart of the setup processing example illustrated in FIG. 9, first of all, the control section 250 determines whether or not the second user program execution ID 20 has already been configured for the Project PR (Process S21).

If the second user program execution ID 20 has already been set up for the Project PR (Process S21: Yes), a message is displayed to the effect that the second user program execution ID 20 has already been set up (Process S22) and processing is terminated. On the other hand, if the second user program execution ID 20 has not been set up yet for the Project PR (Process S21: No), the program advances to Process S23.

Next, it receives the entry of the second user program execution ID 20 (see FIG. 7) (Process S23) and determines whether or not the Cancel button BT4 has been actuated (Process S24). If the Cancel button BT4 has been actuated (Processes S24: Yes), processing is terminated. On the other hand, if the Cancel button BT4 has not been actuated (Process S24: No), it is determined whether or not the OK button BT3 has been actuated (Process S25). If the OK button BT3 has not been actuated (Process S25: No), the program advances to S23. On the other hand, if the OK button BT3 has been actuated (Process S25: Yes), a message is displayed to prompt the user to actuate (press) a verification key (for example, the "Y" key) (Process S26).

Next, it is determined whether or not the verification key (for example, the "Y" key) has been actuated (pressed) (Process S27). If a key other than the verification key has been actuated (Process S27: No), the program advances to Process S23, and if the verification key (for example, the "Y" key) has been actuated (Process S27: Yes), the program advances to Process S28.

Next, it is determined (Process S28) whether or not the second user program execution ID 20 entered in the first entry field IP2 matches the second user program execution ID 20 used for verification entered in the second entry field IP3. If there is no match (Process S28: No), a message is displayed to the effect that there is no match (Process S29) and the program advances to S23. On the other hand, when there is a match (Process S28: Yes), the second user program execution ID 20 is set up in the Project PR (Process S30) and processing is terminated.

(Displaying the Second User Program Execution ID)

In addition, the control section 250 is configured such that it does not have the capability to display the second user program execution ID 20 stored in the storage area 224a of the HDD apparatus 224 once it has been configured in the Project PR (specifically, the display of the second user program execution ID 20 is prohibited).

In this embodiment, the control section 250 operates as an appending section Qa5 (see FIG. 4). Namely, the tool program P directs the control section 250 to carry out an appending step corresponding to the appending section Qa5.

(Appending Step)

In the appending step, the second user program execution ID 20 used in the Project PR (see FIG. 8) is appended to a user program YP. Specifically, in the appending step, the second user program execution ID 20 used in Project PR is read out and the second user program execution ID 20 read from the Project PR is incorporated into the object code of the user program YP (see FIG. 10 discussed below) compiled by a compiler corresponding to the language of the user program YP.

Figures 10, 11:
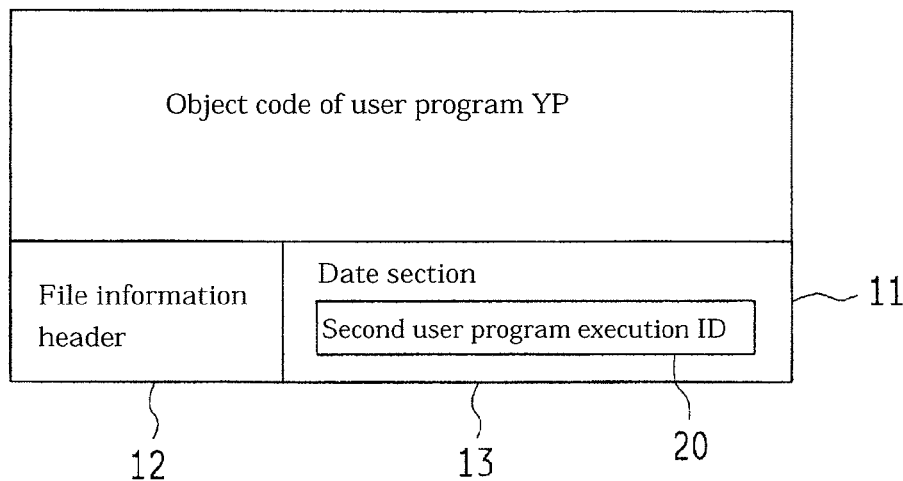
FIG. 10 is a schematic view illustrating the data structure of the second user program execution ID appended to the user program.
FIG. 11 is a table illustrating an example of conditions of match and mismatch between the first user program execution ID and the second user program execution ID.

FIG. 10 is a schematic view illustrating the data structure of the second user program execution ID 20 appended to the user program YP.

As shown in FIG. 10, the file data 11 of the second user program execution ID 20 appended to the object code of the user program YP is composed of a file information header 12 and a data section 13. The version of the file and other file information is recorded in the file information header 12. The second user program execution ID 20 is stored in the data section 13.

Then, in the transmitting step, the user program YP to which the second user program execution ID 20 has been appended in the appending step is transmitted to the PLC 100.

It should be noted that the second user program execution ID 20 and the user program YP can be transmitted to the PLC 100 separately. In this case, the second user program execution ID 20 and the user program YP may be transmitted simultaneously or at different times.

In this embodiment, the control section 250 operates as an encrypting section Qa6 (see FIG. 4). Namely, the tool program P directs the control section 250 to carry out an encrypting step corresponding to the encrypting section Qa6.

(Encrypting Step)

In the encrypting step, the first user program execution ID 10 received in the first receiving step and the second user program execution ID 20 received in the second receiving step are irreversibly encrypted. As used herein, the term "irreversible encryption process" refers to a process, in which it is impossible to go back to the original ID code, and if the same character string is encrypted using the same cryptographic key, the generated character string will be the same. It should be noted that the irreversibly encrypted first and second user program execution IDs 10 and 20 may be decoded during matching.

In addition, in the first setup step, the second user program execution ID 20 encrypted in the encrypting step is configured in the Project PR. In addition, in the transmitting step, the first user program execution ID 10 encrypted in the encrypting step is transmitted to the PLC 100.

[PLC Software Configuration] The microprocessor 111 of the PLC 100 operates as a second setup section Qb1, storage control section Qb2, checking section Qb3, and execution-blocking section Qb4 (see FIG. 2). Namely, the system programs SP direct the microprocessor 111 to carry out a second setup step corresponding to the second setup section Qb1, a storage control step corresponding to the storage control section Qb2, a matching step corresponding to the checking section Qb3, and an execution blocking step corresponding to the execution-blocking section (block executor) Qb4. It should be noted that the unblocking section (unblocker) Qb5 illustrated in FIG. 2 will be described later.

(Second Setup Step)

In the second setup step, the first user program execution ID 10 transmitted to the PLC 100 in the transmitting step carried out by the tool device 200 is configured and stored in the storage area 113a of the ID storage memory 113 (see FIG. 2) provided in the PLC 100.

In addition, if the first user program execution ID 10 is encrypted by the tool device 200, in the second setup step, the first user program execution ID 10 encrypted in the encrypting step carried out by the tool device 200 and transmitted to the PLC 100 in the transmitting step is configured and stored in the storage area 113a of the ID storage memory 113.

(Writing the First User Program Execution ID)

Here, the configuration of the PLC 100 permits rewriting and erasing the first user program execution ID 10 in the ID storage memory 113.

Namely, regardless of whether or not the first user program execution ID 10 has been set up (stored) in the storage area 113a of the ID storage memory 113, in the second setup step, the first user program execution ID 10 can be changed and erased. Changes to the first user program execution ID 10 can be made via the first user program execution ID setup screen 231a illustrated in FIG. 5.

(Erasing the First User Program Execution ID)

The first user program execution ID 10 stored in the storage area 113a of the ID storage memory 113 can be erased from the CPU unit 110 with the help of its memory clearing capability. Namely, the use of the memory clearing function in the CPU unit 110 produces a state wherein no first user program execution ID 10 is set up in the storage area 113a of the ID storage memory 113 and the ID storage memory 113 goes back to its initial unconfigured state.

(Displaying the First User Program Execution ID)

In addition, the control section 250 provided in the tool device 200 is configured such that it does not have the capability to display the first user program execution ID 10 stored in the ID storage memory 113 upon setup in the storage area 113a of the ID storage memory 113 (specifically, the display of the first user program execution ID 10 is prohibited).

(Storage Control Step)

In the storage control step, the user program YP to which the second user program execution ID 20 has been appended in the appending step performed by the tool device 200 and then transmitted to the PLC 100 in the transmitting step is stored in the backup memory 114 (see FIG. 2) of the PLC 100.

(Matching Step)

In the matching step, a matching operation is performed to determine whether or not the first user program execution ID 10 matches the second user program execution ID 20. Specifically, the first user program execution ID 10 stored in the ID storage memory 113 is checked against the second user program execution ID 20 transferred from the Project PR and stored in the backup memory 114.

In this embodiment, when the user program YP stored in the backup memory 114 is stored in user memory 116 in the matching step, the first user program execution ID 10 is checked against the second user program execution ID 20. Specifically, the first user program execution ID 10 stored in the ID storage memory 113 is read out, the user program YP is read out from the backup memory 114, the second user program execution IDs 20 appended (incorporated into) to the user programs YP is obtained from the user program YP, and the first user program execution ID 10 read out from the ID storage memory 113 is checked against the second user program execution ID 20 obtained from the user program YP.

Here, the first user program execution ID 10 and second user program execution ID 20 are irreversibly encrypted such that character strings generated by encrypting the same character strings using the same cryptographic keys are identical. For this reason, in the matching step, the character string of the irreversibly encrypted first user program execution ID 10 is checked against the character string of the irreversibly encrypted second user program execution ID 20.

In this embodiment, the match and mismatch between the first user program execution ID 10 and second user program execution ID 20 is determined based on the conditions illustrated in FIG. 11. FIG. 11 is a table illustrating an example of conditions of match and mismatch between the first user program execution ID 10 and second user program execution ID 20.

As shown in FIG. 11, a match is found when the first user program execution ID 10 has not been set up in the ID storage memory 113 and when the second user program execution ID 20 has not been set up in the Project PR.

A match is found when the first user program execution ID 10 has been set up in the ID storage memory 113, when the second user program execution ID 20 has been set up in the Project PR, and when the two IDs 10 and 20 are identical.

A mismatch is found when the first user program execution ID 10 has been set up in the ID storage memory 113 and when the second user program execution ID 20 has not been set up in the Project PR.

A mismatch is found when the first user program execution ID 10 has not been set up in the ID storage memory 113 and when the second user program execution ID 20 has been set up in the Project PR.

A mismatch is found when the first user program execution ID 10 has been set up in the ID storage memory 113, when the second user program execution ID 20 has been set up in the Project PR, and when the two IDs 10 and 20 are not identical.

In this embodiment, the timing of the matching of the first user program execution ID 10 against the second user program execution ID 20 is either after powering ON the PLC 100 and storing the user program YP from the backup memory 114 in the user memory 116 (upon powering ON), or after storing the user program YP from the tool device 200 in the backup memory 114 provided in the PLC 100 and storing the user program YP from the backup memory 114 in the user memory 116 (upon download).

(Execution Blocking Step)

In the execution blocking step, the execution of the user program YP is blocked if, according to the checking results obtained by means of matching in the matching step, it is determined that there is a mismatch between the first user program execution ID 10 and second user program execution ID 20.

Furthermore, in this embodiment, the microprocessor 111 operates as an unblocking section Qb5. Namely, the system programs P direct the microprocessor 111 to carry out an unblocking step corresponding to the unblocking section Qb5 (see FIG. 2).

(Unblocking Step)

The unblocking step unblocks the state of the user program YP blocked in the execution blocking step by restarting the CPU unit 110 (specifically, by turning the power of the CPU unit 110 OFF/ON or by performing a reset through the user program development support software of the tool device 200).

(Example of ID Match Processing)

Figure 12:
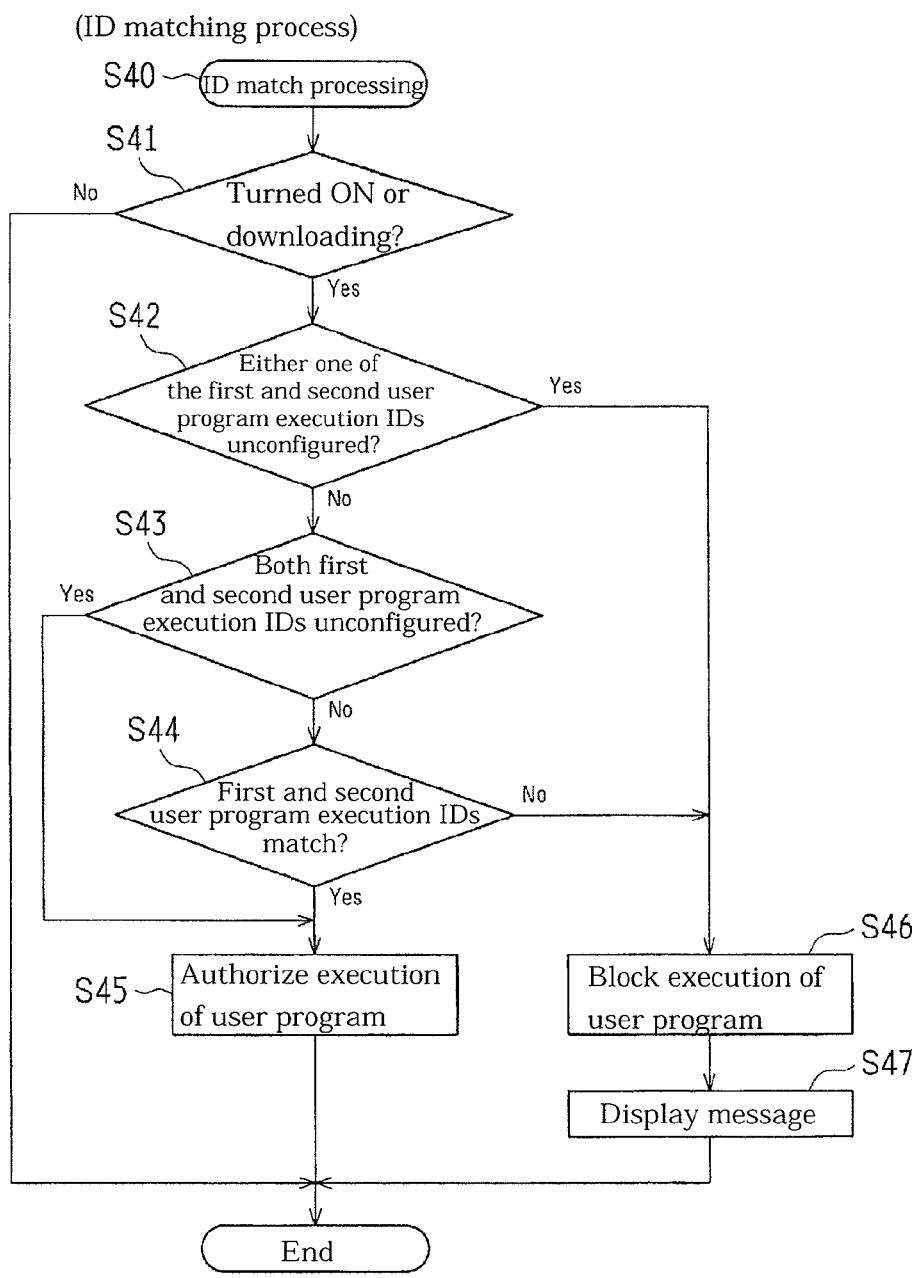
FIG. 12 is a flowchart illustrating an example of match processing used to match the first user program execution ID against the second user program execution ID.

Next, an example of match processing S40 that matches the first user program execution ID 10 against the second user program execution ID 20 will be described below with reference to FIG. 12. FIG. 12 is a flowchart illustrating an example of a match process S40 that matches the first user program execution ID 10 against the second user program execution ID 20. It should be noted that the flowchart illustrated in FIG. 12 is a detailed flowchart of the ID match process S40 illustrated in FIG. 3.

In the flowchart of the ID match processing example illustrated in FIG. 12, it is determined whether the system is turned ON or downloading (Process S41). If it is not turned ON (Process S41: No), the program goes back to the initializing process (Process S1) in the processing performed by the entire PLC 100 illustrated in FIG. 3, and if it is not downloading (Process S41: No), the program goes back to the mode loading process (Process S3) in the processing performed by the entire PLC 100 illustrated in FIG. 3. On the other hand, it advances to Process S42 if the system is turned ON or downloading (Process S41: Yes).

Next, it is determined whether either one of the first and second user program execution IDs 10, 20 is unconfigured (Process S42). If either the first or second user program execution IDs 10, 20 is unconfigured (Process S42: Yes), the program advances to Process S46. On the other hand, if either the first or second user program execution IDs 10, 20 is not unconfigured (Process S42: No), it is determined whether or not both the first and second user program execution IDs 10, 20 are unconfigured (Process S43).

If both the first and second user program execution IDs 10, 20 are unconfigured (Process S43: Yes), the program advances to Process S45. On the other hand, if both the first and second user program execution IDs 10, 20 are not unconfigured (Process S43: No), it is determined whether there is a match between the first and second user program execution IDs 10, 20 (Process S44).

If there is a match between the first and second user program execution IDs 10, 20 (Process S44: Yes), the program advances to Process S45. On the other hand, if the first and second user program execution IDs 10, 20 do not match (Process S44: No) the program advances to Process S46.

Process S45 authorizes the execution of the user program YP and the program goes back to the processing involving the entire PLC 100 illustrated in FIG. 3.

Process S46 blocks the execution of the user program YP and displays a message to the effect that the IDs do not match (Process S47), whereupon the program goes back to the processing involving the entire PLC 100 illustrated in FIG. 3. Here, the message saying that the IDs do not match is displayed using the display capability of the PLC 100 (omitted in FIG. 1). As an example, the use of LED lamps in implementing the display capability can be illustrated by an embodiment, in which predetermined LEDs are lit and extinguished. As an example, the use of liquid crystal display devices in implementing the display capability can be illustrated by an embodiment, in which predetermined character strings are displayed.

(Regarding this Embodiment)

As explained above, in accordance with this embodiment, entry information for a first user program execution ID 10 is received, the first user program execution ID 10 is transmitted to the PLC 100, and the first user program execution ID 10 is then transmitted to the PLC 100 and set up in the PLC 100. In addition to that, entry information for a second user program execution ID 20, which is checked in order to run the user program YP, is received and the second user program execution ID 20 is set up in a Project PR provided in a tool device 200. For this reason, even if the the user does not create user program YP in order to perform ID matching, unauthorized use of the user program YP running on the PLC 100 can be prevented based on a simple operation involving entering an ID, thereby making it possible to improve convenience in the prevention of unauthorized use of the user program YP running on the PLC 100.

In addition, the tool device 200 is configured such that once the second user program execution ID 20 has been set up for the Project PR provided in the tool device 200, the second user program execution ID 20 can no longer be changed or erased. For this reason, persons other than the original user who configured the second user program execution ID 20 (and users including users who learned about it from the user) will have extreme difficulty in overwriting or stealing the configured second user program execution ID 20. In addition, as a result of using a configuration that permits overwriting and erasing the first user program execution ID 10 in the ID storage memory 113 provided in the PLC 100, the original user can set up a first user program execution ID 10 matching the second user program execution ID 20. Consequently, a match between the first user program execution ID 10 and second user program execution ID 20 in the PLC 100 based on matching results produced by means of matching allows for the user program YP to be run on the PLC 100. On the other hand, when a person other than the original user sets up a first user program execution ID 10 that is different from the second user program execution ID 20, the fact that, according to the checking results obtained by means of matching, the first user program execution ID 10 does not match the second user program execution ID 20 in the PLC 100 results in the blocking of the execution of the user program YP, thereby making it impossible to run the user program YP. Furthermore, since the tool device 200 is configured such that it does not have the capability to display the first user program execution ID 10 in the ID storage memory 113 of the PLC 100 nor the capability to display the second user program execution ID 20 in the Project PR, it becomes extremely difficult for the original user or persons other than the original user to obtain the first user program execution ID 10 and second user program execution ID 20 from the tool device 200. It should be noted that in this embodiment it is extremely difficult to move the ID storage memory 113 to another PLC because the ID storage memory 113 is non-removably mounted to a control board (via direct attachment).

Further, in this embodiment, the user programs YP are managed in the form of a project PR and the second user program execution ID 20 is set up in the Project PR. Therefore, the second user program execution ID 20 can be easily associated with a user program YP.

Further, in this embodiment, the first user program execution ID 10 received by the first receiving section Qa1 and the second user program execution ID 20 received by the second receiving section Qa3 are encrypted and, for this reason, even if the first user program execution ID 10 and/or second user program execution ID 20 are improperly read and stolen, it is very difficult for persons other than the original user to learn the first user program execution ID 10 and/or second user program execution ID 20 because the first user program execution ID 10 and second user program execution ID 20 are encrypted. This makes it possible to improve security in terms of preventing the first user program execution ID 10 and/or second user program execution ID 20 from being leaked. Furthermore, since the encryption process is an irreversible encryption process and it is impossible to go back to the original ID code, there is no way to get information on the original ID code.

Further, in this embodiment, the second user program execution ID 20 of the Project PR provided in the tool device 200 is stored in the backup memory 114 of the PLC 100, which makes it possible to easily match the first user program execution ID 10 against the second user program execution ID 20 even without getting the second user program execution ID 20 from the tool device 200 during each matching operation.

Further, in this embodiment, the second user program execution ID is appended to the user program by the appending section and the user program to which the second user program execution ID has been appended by the appending section is transmitted to the programmable controller and stored in the programmable controller by the storage control section (storage controller), thereby making it possible to conceal the existence of the second user program execution ID 20 in the PLC 100.

Further, in this embodiment, due to the fact that the first user program execution ID 10 is checked against the second user program execution ID 20 when the user program YP stored in the backup memory 114 is stored in the volatile memory, the first user program execution ID 10 and second user program execution ID 20 can be reliably checked prior to running the user program YP.

Further, in this embodiment, when the execution of the user program YP is blocked, the blocked state of execution of the user program YP is unblocked by restarting the CPU unit 110. As a result, this can increase the effort involved in unauthorized writing of the first user program execution ID 10 to the ID storage memory 113 by persons other than the original user, and therefore, makes it possible to preclude wrongdoing by other persons.

Further, in this embodiment, the contents of the first user program execution ID 10 in the ID storage memory 113 are rewritable at discretion and, accordingly, when the PLC 100 is replaced with another PLC 100 for reasons such as malfunction and the like, the contents of the first user program execution ID 10 in the ID storage memory 113 of the replaced PLC 100 can be overwritten with the same contents as those of the first user program execution ID 10 of the PLC 100 before the replacement, thereby making it possible to operate the user program YP on the replaced PLC 100.

It should be noted that when multiple PLCs 100 are provided in the programmable controller system 300, setting up an ID coinciding with the second user program execution ID 20 configured in the tool device 200 as the first user program execution ID 10 of the multiple PLCs 100 in the ID storage memory 113 allows for unauthorized use of the user program YP to be prevented in the same manner as above even when there are multiple PLCs 100.

All the embodiments disclosed herein should be regarded as illustrative rather than limiting in all respects. It is intended that the scope of the disclosure be defined not by the foregoing description, but by the claims, including all changes that come within the meaning and range of equivalents thereof.

INDEX TO THE REFERENCE NUMERALS

10 First user program execution ID
20 Second user program execution ID
100 Programmable controller
113 ID storage memory
114 Backup memory (an example of a non-volatile memory)
116 User memory (an example of a volatile memory)
200 Tool device
224 HDD apparatus
300 Programmable controller system
M Storage medium
PR Project
Qa1 First receiving section
Qa2 Transmitting section
Qa3 Second receiving section
Qa4 First setup section
Qa5 Appending section
Qa6 Encryption section
Qb1 Second setup section
Qb2 Storage control section
Qb3 Checking section
Qb4 Execution-blocking section
Qb5 Unblocking section
YP User program

What is claimed is:

1. A programmable controller system comprising a programmable controller including a first processor, and a tool device communicating with the programmable controller, including a second processor configured to execute a user program on the programmable controller,
the tool device comprises:
a first receiver that receives entry information for a first user program execution ID that is checked to execute the user program;
a second receiver that receives entry information for a second user program execution ID that is checked to execute the user program;
a transmitter that transmits the first user pro ram execution ID the second user program execution ID and the user program to the programmable controller; and
a first program setter that sets up, via the second processor, the second user program execution ID in the tool device in association with the user program, and
the programmable controller comprises:
a second program setter that sets up, via the first processor, the first user program execution ID transmitted by the transmitter to the programmable controller;
a non-removable storage memory that stores, in the programmable controller, the first user program execution ID;
a memory that stores, in the programmable controller, the second user program execution ID and the user program transmitted to the programmable controller;
a comparator checker that checks, via the first processor, whether the first user program execution ID matches the second user program execution ID; and
a block executor that blocks, via the first processor, the execution of the user program when, according to the results of a check obtained by the comparator checker, the first user program execution ID does not match the second user program execution ID,
wherein the tool device is configured not to permit setup and not to permit erasure of the second user program execution ID once the second user program execution ID has been set up,
the tool device is configured to be unable to display the first user program execution ID upon setup in the programmable controller and unable to display the second user program execution ID upon setup in the tool device, and
the programmable controller is configured to permit setting up and erasing of the first user program execution ID.

2. The programmable controller system according to claim 1, wherein the tool device is configured to manage information on a plurality of user programs as a single project and the first program setter sets up the second user program execution ID for the project.

3. The programmable controller system according to claim 1, wherein the tool device comprises an encryptor, implemented by the second processor, that encrypts the first user program execution ID received by the first receiver and the second user program execution ID received by the second receiver,
the transmitter transmits the first user program execution ID to the programmable controller,
the first program setter sets up the second user program execution ID in the tool device, and
the second program setter sets up the first user program execution ID in the programmable controller.

4. The programmable controller system according to claim 1, wherein the tool device comprises an appender, implemented by the second processor, that appends the second user program execution ID to the user program, the transmitter transmits the user program to which the second user program execution ID has been appended to the programmable controller, and the storage controller stores the user program to which the second user program execution ID has been appended in the programmable controller.

5. The programmable controller system according to claim 1, wherein the programmable controller is configured to store the user program in a non-volatile memory of the programmable controller, and the comparator checker checks, via the first processor, the first user program execution ID against the second user program execution ID when the user program stored in the non-volatile memory is also stored in a volatile memory of the programmable controller.

6. The programmable controller system according to claim 1, wherein the programmable controller comprises an unblocker, implemented by the first processor, that, by restarting the programmable controller, unblocks the execution of the user program blocked by the block executor.

* * * * *